United States Patent

Yoshioka et al.

[11] Patent Number: 5,853,597
[45] Date of Patent: Dec. 29, 1998

[54] METHOD OF AND APPARATUS FOR DISCHARGING SEDIMENTARY SOLID PARTICLES

[75] Inventors: Masahiro Yoshioka; Masahiko Ito; Mitsuru Sakuta; Makoto Suzuki; Masaharu Ikeda, all of Chiba, Japan

[73] Assignee: Kawasaki Steel Corporation, Kobe, Japan

[21] Appl. No.: 836,699

[22] PCT Filed: Sep. 26, 1996

[86] PCT No.: PCT/JP96/02780

§ 371 Date: May 19, 1997

§ 102(e) Date: May 19, 1997

[87] PCT Pub. No.: WO97/12077

PCT Pub. Date: Apr. 3, 1997

[30] Foreign Application Priority Data

Sep. 28, 1995 [JP] Japan .................................... 7-251141
Sep. 29, 1995 [JP] Japan .................................... 7-252604
Sep. 29, 1995 [JP] Japan .................................... 7-252605

[51] Int. Cl.$^6$ .................................................. B01D 21/24
[52] U.S. Cl. ........................ 210/712; 134/13; 134/22.18; 134/108; 134/167 R; 210/737; 210/803; 210/167; 210/181; 210/523
[58] Field of Search ..................... 210/710, 712, 210/800, 803, 805, 774, 167, 181, 195.1, 523, 525, 737; 134/21, 13, 22.18, 24, 108, 167 R, 172, 198

[56] References Cited

U.S. PATENT DOCUMENTS

| 4,426,233 | 1/1984 | Manabe et al. ............................ 134/21 |
| 4,642,138 | 2/1987 | Koyase et al. ....................... 134/22.18 |
| 4,913,819 | 4/1990 | Patterson .................................. 210/523 |

FOREIGN PATENT DOCUMENTS

| 54-157918 | 4/1953 | Japan . |
| A-55-2476 | 1/1980 | Japan . |
| U-55-53508 | 4/1980 | Japan . |
| A-58-55012 | 4/1983 | Japan . |
| B2-2-10874 | 3/1990 | Japan . |
| 3-14151 | 2/1991 | Japan . |
| 6-39960 | 5/1994 | Japan . |
| A-7-90659 | 4/1995 | Japan . |
| 07126876 | 5/1995 | Japan . |

*Primary Examiner*—Peter A. Hruskoci
*Attorney, Agent, or Firm*—Oliff & Berridge, PLC

[57] ABSTRACT

The present invention provides a method of and an apparatus for efficiently and economically discharging solid particles, which have sedimented on the bottom of a tank, out from the tank. A liquid is ejected from an ejector installed in the tank to move the sedimented solid particles to a predetermined place from which the sedimented solid particles are discharged out from the tank. Further, a solution which contains sedimentary solid particles is cooled and the solid particles are efficiently separated by a solid-liquid separator.

23 Claims, 12 Drawing Sheets

PICKLING TANK

METHOD OF AND APPARATUS FOR DISCHARGING SEDIMENTARY SOLID PARTICLES

This application is a 371 of PCT/JP96/02780 filed Sep. 26, 1996, published as WO97/12077 Apr. 3, 1997.

FIELD OF THE INVENTION

The present invention relates to a method of and an apparatus for preventing sludge or other solid particles from piling up in a pickling tank, a circulating tank, plating tank, or other equipment for pickling or plating metallic materials and also for efficiently discharging such solid particles out of the tanks.

RELATED ART

In general, when pickling metallic materials, surface scales and a compound composed of metal and an acid solution turn into sludge which sometimes accumulates in a pickling tank and a circulating tank which is installed as necessary. Especially when steel materials made of stainless steel or the like is treated with a pickling solution which contains hydrofluoric acid, the sludge solidifies in a tank, requiring a great deal of labor and time (see Japanese Patent Publication No. 55-2476) for cleaning the tank to remove the solidified sludge. Such cleaning is possible only after the operation is shut down and it has to be done by "human-wave tactics."

There have been known the following methods to remove the sludge which has accumulated on the bottom of a tank during operation: a method in which a screw conveyor is employed (see Japanese Patent Laid-Open No. 58-55012); a method in which sludge is scraped to a pit groove provided on one end of a tank by feeding members mounted on two endless chains (see Japanese Unexamined Utility Model Publication No. 55-53508); and a method in which a scraper is used in a pickling tank, and a sedimentation tank is provided (see Japanese Patent Publication No. 2-10874). None of these methods, however, disclose or suggest the present invention which will be set forth below.

The applicants of the present invention have proposed a method in Japanese Patent Laid-Open No. 7-90659 wherein a pickling solution is ejected from an ejector which is installed on the bottom of a pickling tank for pickling metallic materials and from an ejector installed on the bottom of a circulating tank, if any, so as to suspend the sludge in the pickling solution to prevent it from sedimenting in the aforesaid tanks. A part of the pickling solution which contains the suspended sludge is separated into solid and liquid by using a solid-liquid separator; the separated liquid which contains substantially no sludge is circulated as the pickling solution and the separated sludge is discharged out of the pickling system.

The method proposed in the foregoing is good as a method for discharging sludge out of the pickling system; a basic idea thereof is to prevent sludge from sedimenting in a tank by ejecting a liquid through an ejector. This method, however, inevitably involves a large pump for frequently ejecting the solution through the ejector and accordingly consumes a relatively large amount of electricity.

It is an object of the present invention to provide a method for efficiently and economically discharging solid particles, which have sedimented on the bottom of a tank, out of the tank.

It is another object of the present invention to provide a method for efficiently and economically discharging sludge out of a pickling tank and a circulating tank used as auxiliary equipment for metallic steel plates such as stainless steel plates.

It is a further object of the present invention to provide a method for efficiently separating sludge, which is generated from pickling a metallic material in a pickling tank, from a pickling solution.

It is yet another object of the present invention to provide an apparatus which can be employed for the foregoing methods.

DISCLOSURE OF THE INVENTION

1) The present invention relates to a discharging method of sedimentary solid particles, whereby sedimentary solid particles lying on the bottom of a tank which contains a solution wherein solid particles are present are moved to a predetermined location by ejecting a liquid to the sedimentary solid particles from at least one ejector which is installed in the tank, and the sedimentary solid particles are discharged out of the tank from the location (Embodiment 1).

2) In the above clause 1), the sedimentary solid particles are moved into a pocket installed in a tank and the sedimentary solid particles which have been collected in the pocket are discharged out of the tank (Embodiment 2).

3) In the above clause 2), a liquid is ejected from at least one ejector which is provided on one end in a tank to move sedimentary solid particles into a pocket which is installed at the other end so that it faces against the ejector, and the sedimentary solid particles are discharged out of the tank (Embodiment 3).

4) In the above clause 3), the liquid ejected from the ejector is directed downward 1 to 45 degrees with respect to a horizontal surface and it is also directed toward the inside of the tank and toward the pocket with respect to a vertical surface which contains a long side of a horizontal section of the tank (Embodiment 4).

5) In the above clause 1), the liquid is ejected from the ejectors in sequence, beginning with the one that is located far from a discharging place among a plurality of ejectors installed in the tank, thereby gradually moving the sedimentary solid particles toward the discharging place (Embodiment 5).

6) In the above clause 5), the method for discharging sedimentary solid particles out of the tank which has an approximately rectangular horizontal section includes the following steps (Embodiment 6):

(1) a step of disposing a plurality of ejectors on the side walls on both sides of the tank so that they are nearly parallel;

(2) (i) a step (I) wherein a liquid is ejected from at least one of ejectors (A) on one side toward sedimentary solid particles which exist in the effective ejection range of the ejectors (A) so as to move at least a part of the particles to the effective ejection range of ejectors (B) on the other side, and (ii) a step (II) wherein, immediately after or a predetermined time after the ejection of the liquid in the step (I) has substantially been completed, the liquid is ejected from at least one of the ejectors (B) on the other side toward the sedimentary solid particles which have been moved into the effective ejection range of the ejectors (B) in the step (I) so as to move at least a part of the particles, (3) thereby moving the sedimentary solid particles toward the discharging place provided in the tank.

7) In the above clause 6), the step (II) is implemented so that the sedimentary solid particles are moved into the effective range of an ejector (A') which is closer to the discharging place than the ejectors (A) in the step (I) (Embodiment 7).

8) In the clause 7), (1) the steps (I) and (II) are implemented a plurality of times;
  (2) in both steps (I) and (II), the ejectors for ejecting the liquid in the later step are closer to the discharging place than the ejectors used in the earlier step, and
  (3) when the step (I) is carried out after the step (II), the step (I) is started immediately after or a predetermined time after the ejection of the liquid in the step (II) is substantially completed (Embodiment 8).

9) In the above clause 6), the liquid ejected from the ejectors is directed downward 1 to 45 degrees with respect to a horizontal surface and it is also directed toward the inside of the tank by 0 to 85 degrees with respect to a vertical surface which contains a long side of a horizontal section of the tank (Embodiment 9).

10) In the above clauses 1) and 5), the tank is a pickling tank for a stainless steel plate, the solution is a pickling solution, the liquid ejected from the ejectors is the pickling solution, and the solid particles are sludge (Embodiment 10).

11) In the above clause 1), a solution which contains the sedimentary solid particles discharged from the tank is cooled to a temperature below the temperature of the solution in the tank, then the solid particles are separated from the solution by using a solid-liquid separator (Embodiment 11).

12) In the above clause 11), the solid-liquid separator is a sedimentation tank (Embodiment 12).

13) In the above clause 11), the solution is cooled in advance before introducing it into the solid-liquid separator (Embodiment 13).

14) In the clause 11), the solution is cooled after introducing it into the solid-liquid separator (Embodiment 14).

15) In the above clause 11), the solution is the pickling solution and a clean pickling solution from which the solid particles have been separated is heated to a temperature of the temperature in the pickling tank or higher before it is circulated to a pickling process (Embodiment 15).

16) In the above clause 11), the solution is the pickling solution for pickling a stainless steel plate, the pickling solution is a sodium sulfate pickling solution, a sulfuric acid pickling solution, or a nitric hydrofluoric acid pickling solution, and the pickling solution is cooled down to 40 degrees centigrade or lower (Embodiment 16).

17) An apparatus for discharging sedimentary solid particles existing on the bottom of a tank which contains a solution wherein solid particles are present, the apparatus being equipped with:
  (1) at least one ejector which is installed in the tank and which ejects a liquid toward the sedimentary solid particles on the bottom of the tank to move the solid particles to a discharging place;
  (2) a device for discharging the sedimentary solid particles, which have been collected in the discharging place, out of the tank; and
  (3) a controller for ejecting the liquid through the ejector at a desired time.

18) In the above clause 17), the discharging place has a pocket structure (Embodiment 18).

19) In the above clause 17), the ejector is installed on one end of a side wall of the tank, and a pocket for collecting the sedimentary solid particles is installed on the side wall on the other end facing against the ejector (Embodiment 19).

20) In the above clause 17), a plurality of ejectors are installed on both side walls of the tank, and the effective ejection ranges of the respective ejectors partly overlap with the effective ejection range of at least one ejector on the other side (Embodiment 20).

21) In the above clause 17), the following device is further included (Embodiment 21):
  (5) a solid-liquid separator for separating solid particles from a solution which has been discharged from the tank and which contains solid particles.

22) In the above clause 21, the following device is further included (Embodiment 22):
  (6) a heat exchanger for cooling the solution which has been discharged from the tank and fed to the solid-liquid separator.

23) In the above clause 21), the solid-liquid separator has a cooling device (Embodiment 23).

24) In the above clause 21), the tank is a pickling tank for a stainless steel plate, the solution is a pickling solution, the liquid ejected from the ejectors is the pickling solution, and the solid particles are sludge (Embodiment 24).

BEST MODE FOR CARRYING OUT THE INVENTION

According to one aspect of the present invention, there is provided a discharging method of sedimentary solid particles, whereby sedimentary solid particles lying on the bottom of a tank which contains a solution wherein solid particles are present are moved to a predetermined location by ejecting a liquid toward the sedimentary solid particles through at least one ejector which is installed in the tank, and the sedimentary solid particles are discharged out of the tank from that location.

According to a second aspect of the present invention, there is provided a method for discharging sedimentary particles out of the tank which holds a solution wherein solid particles exist and which has an approximately rectangular horizontal section, the method including:

(1) a step for disposing a plurality of ejectors on the side walls on both sides in the tank so that they are nearly parallel;

(2) (i) a step (I) wherein a liquid is ejected from at least one of ejectors (A) on one side toward sedimentary solid particles which exist in the effective ejection range of the ejectors (A) so as to move at least a part of the particles to the effective ejection range of ejectors (B) on the other side, and (ii) a step (II) wherein, immediately after or a predetermined time after the ejection of the liquid in the step (I) has substantially been completed, the liquid is ejected from at least one of the ejectors (B) on the other side toward the sedimentary particles which have been moved into the effective ejection range of the ejectors (B) in the step (I) so as to move at least a part of the particles; and (3) a step wherein the sedimentary particles are moved toward a particulate discharging port provided in the tank.

Further, according to a third aspect of the present invention, there is provided an apparatus for discharging sedimentary particles out of a tank which holds a solution wherein sedimented solid particles exist and which has an approximately rectangular horizontal section, wherein:

(1) a plurality of ejectors for ejecting a liquid to the sedimentary particles are disposed approximately in parallel on the side walls on both sides of the tank;

(2) each ejector on either side has at least one ejector on the other side, the effective ranges of which are partly overlapped with each other; and (3) means for ejecting the liquid through the ejectors at a desired time is provided.

Moreover, according to a fourth aspect of the present invention, there is provided a method for efficiently removing solid particles from a solution wherein solid particles exist.

Furthermore, according to the fifth aspect of the present invention, there is provided an apparatus for discharging sedimentary solid particles from a tank which holds a solution wherein sedimented solid particles are present, wherein:

(1) at least one ejector for ejecting a liquid to sedimentary solid particles is installed in a tank;

(2) means for discharging collected sedimentary solid particles out of the tank is provided; and (3) means for ejecting the liquid through the ejector at a desired time is provided.

The objects and advantages of the present invention are accomplished by the methods and apparatuses described above.

The present invention will now be described in detail, whereby other objects, advantages, and features of the present invention will become apparent.

Figure 1:
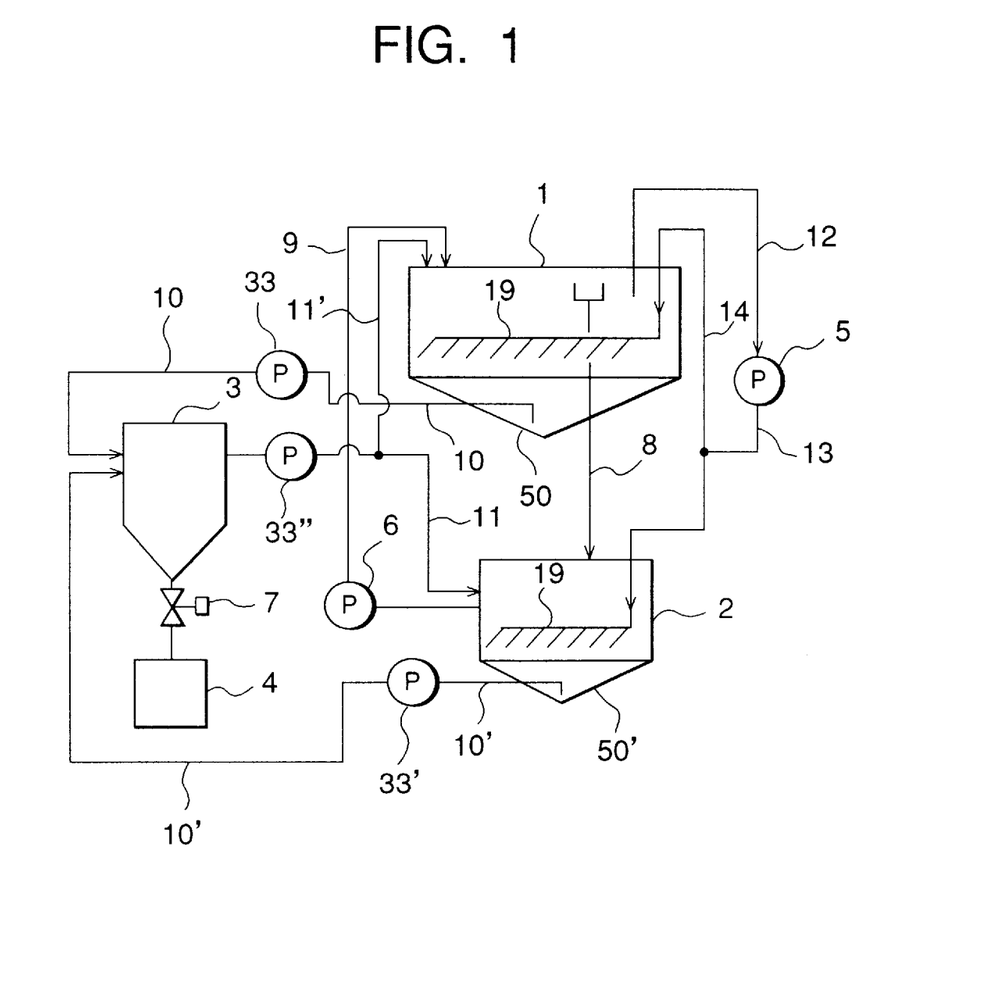
FIG. 1 is a flowchart schematically showing an embodiment of the present invention.
Figure 2:
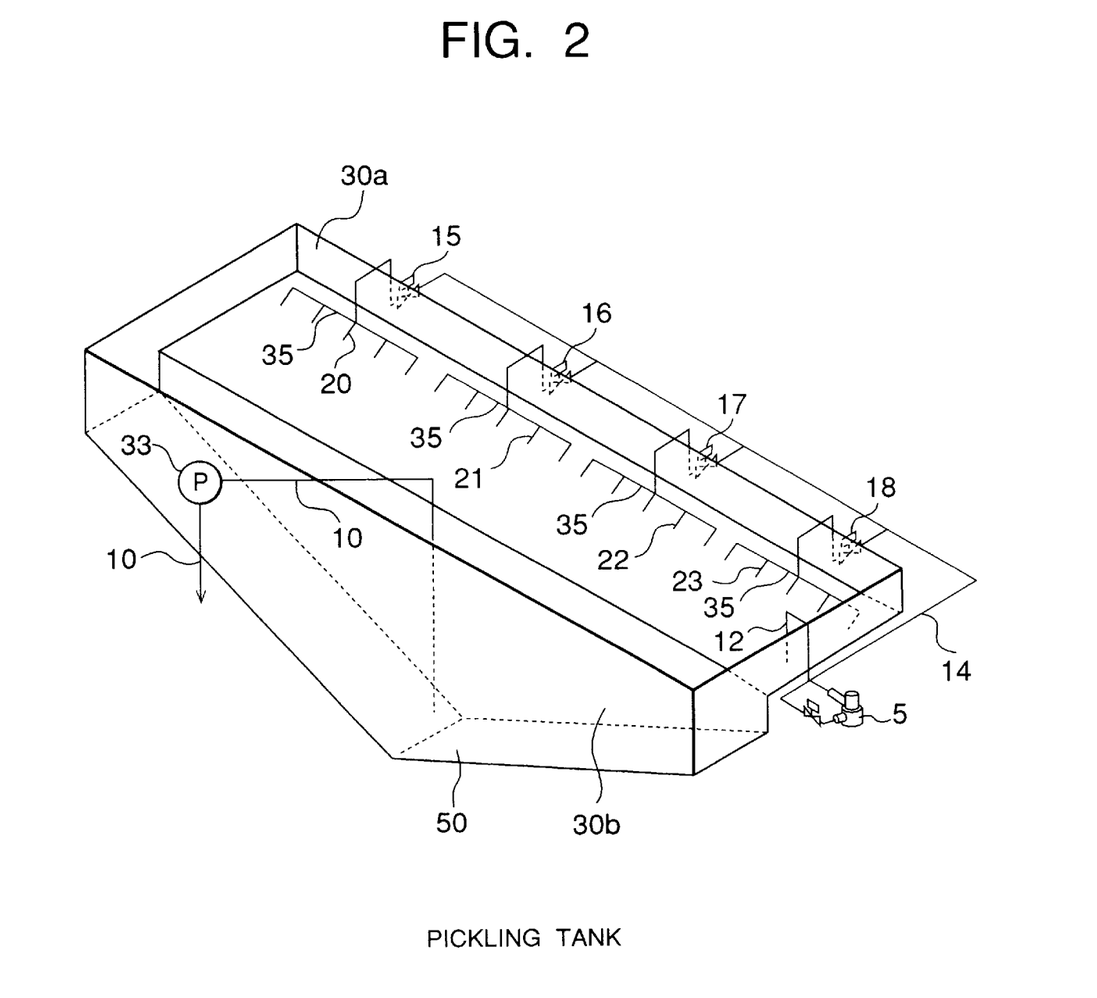
FIG. 2 is a diagram schematically showing a pickling tank and ejectors installed therein.

Referring to FIG. 1 and FIG. 2, the flow of process for discharging sludge, i.e. solid particles, from a pickling tank employed in a pickling process for stainless steel plates in accordance with the method and apparatus of the present invention will be described.

FIG. 1 is a schematic diagram showing the pickling process of stainless steel plates. Stainless steel plates (not shown) are pickled in a pickling tank 1. The pickling solution which has overflown from the pickling tank 1 is supplied to a circulating tank 2 via a passage 8. The pickling solution in the circulating tank 2 is returned to the pickling tank 1 via a passage 9 by a pump 6.

The circulating tank 2 is used for adjusting the acid concentration of the pickling solution and for storing the pickling solution in the pickling tank.

The pickling solution in the pickling tank 1 is led to an ejector 19 of the pickling tank 1 or the circulating tank 2 via a passage 12 and a passage 13 by a pump 5. Further, the sludge sedimenting in pockets 50 and 50' which are installed in the pickling tank 1 and the circulating tank 2 is sent, together with the pickling solution, to a sedimentation tank 3 via a passage 10 and a passage 10' by actuating pumps 33 and 33'. Clean pickling solution which has been separated in the sedimentation tank 3 and which does not substantially contain sludge is returned to the circulating tank 2 via a pump 33" and a passage 11 for recycling. Apparently, when no circulating tank 2 is used, the clean pickling solution is directly returned to the pickling tank 1 via a passage 11'.

The sludge which has been separated and sedimented in the sedimentation tank 3 is stored in a reservoir 4 by opening a valve 7 at an appropriate timing in accordance with the sedimentary amount and it is discharged out of the pickling system. The amount of the sludge to be discharged out of the system is set to a value which is equal to or greater than the amount of the sludge which is generated in the pickling tank 1 so as to prevent the amount of accumulated sludge in the pickling system from increasing.

FIG. 2 is a schematic diagram illustrative of the pickling tank 1 shown in FIG. 1, the ejector 19 installed on the bottom thereof, and a line to the sedimentation tank 3 via the pocket 50 and the passage 10. Several ejectors 20, 21, 22, and 23 are communicated with distribution pipes 35; a plurality of the distribution pipes 35 are installed along a side wall 30a on one side of the pickling tank 1.

The number of the ejectors, an appropriate number of the distribution pipes, the disposition of the distribution pipes, etc. can be decided according to the size and shape of the pickling tank 1.

The pickling solution is normally ejected from the ejectors downward aslant; however, the ejecting direction can be changed as necessary according to the distance between the ejectors and the pocket.

Figure 3:
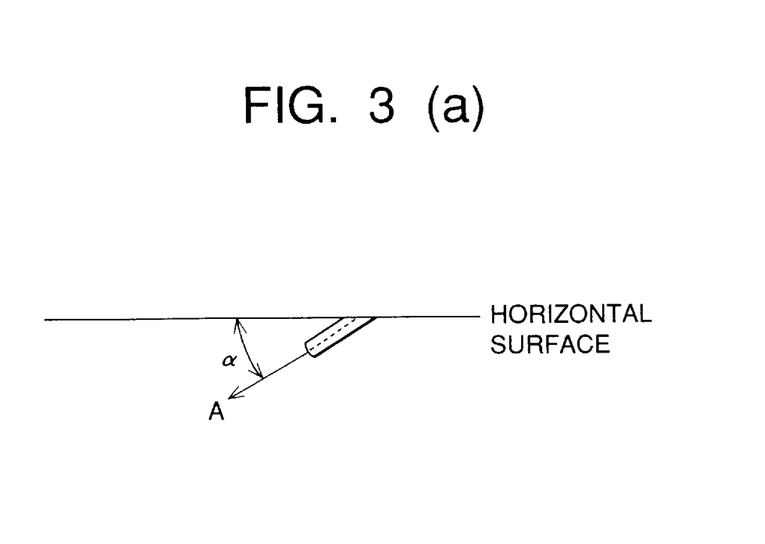
FIG. 3 is a diagram showing the ejecting direction of a liquid from the ejectors.

To be more specific, preferably, the ejectors are installed downward at 1 to 45 degrees with respect to a horizontal surface and more preferably 5 to 30 degrees downward (indicated as "a" in FIG. 3(*a*)), and they are to be installed inward with respect to a vertical surface formed by the side wall 30a of the pickling tank and directed toward the pocket 50 (as indicated in FIG. 3(*b*)).

It should be noted that the liquid ejecting directions of the plurality of ejectors 20, 21, 22, and 23 do not have to be the same for effectively moving sedimentary sludge; they may be designed to be different.

The ejecting speed, ejecting time, and ejecting amount of the pickling solution ejected from the ejectors 20, 21, 22, and 23 are determined by such factors as the amount of the sedimentary sludge, the properties (particle size, specific gravity, etc.) Of the sludge, and the interval between the ejector and the pocket.

By employing the pickling tank, the sedimentary sludge which has sedimented on the bottom of the pickling tank is transferred to the pocket 50 by ejecting the pickling solution from the ejectors which are disposed as described above.

The pocket is installed on the bottom of the pickling tank 1 so that it is close to a side wall 30b of the pickling tank 1. In the case shown in FIG. 2, the pocket 50 is installed adjacently to the whole area of the side wall 30b. The bottom of the pocket 50 is deeper than the bottom of the pickling tank excluding the pocket 50; it forms a slant surface. In the case shown in FIG. 2, the pocket 50 is deepest nearly at the center thereof where sludge sediments and gathers. It is obvious that the deepest part does not necessarily have to be the center of the pocket; it may be, for example, in the vicinity of an end section.

The passage 10 and the pump 33 are installed to discharge the sludge, which has sedimented in the deepest part of the pocket 50, from the pickling tank.

As described above, operating the pickling tank 1 generates the sludge and the generated sludge sediments on the bottom of the pickling tank 1. The sludge which has sedimented on the bottom is moved to the pocket 50 by ejecting the pickling solution from the ejectors 20, 21, 22, and 23; it then sediments on the bottom of the pocket 50 and gathers around the deepest part thereof. The sedimentary sludge which has gathered around the deepest part is sucked into the passage 10 together with the pickling solution by actuating the pump 33 and it is fed to the sedimentation tank 3 via the passage 10.

To eject the pickling solution from the ejectors 20, 21, 22, and 23, the pump 5 is actuated in order to open the valves 15, 16, 17, and 18. The pickling solution does not necessarily have to be ejected from all the ejectors 20, 21, 22, and 23; the pickling solution may be ejected only from necessary ejector or ejectors according to the degree of the sedimentation of the sludge.

By the series of operations described above, the sedimentary sludge is discharged out of the tank; however, the operation of the pickling process is continuously performed and therefore, sludge sediments in the tank again. Hence, the foregoing series of operations are repeated at a proper timing to discharge the sedimentary sludge out of the tank.

According to the method described above, it is not necessary to eject the pickling solution from all ejectors at all times; instead, the solution is ejected from an ejector or ejectors only when discharging the sedimentary sludge from the tank. This leads to reduced consumption of electric power. Thus, the method in accordance with the present invention is economical.

The second aspect of the present invention will now be described.

Figure 4:
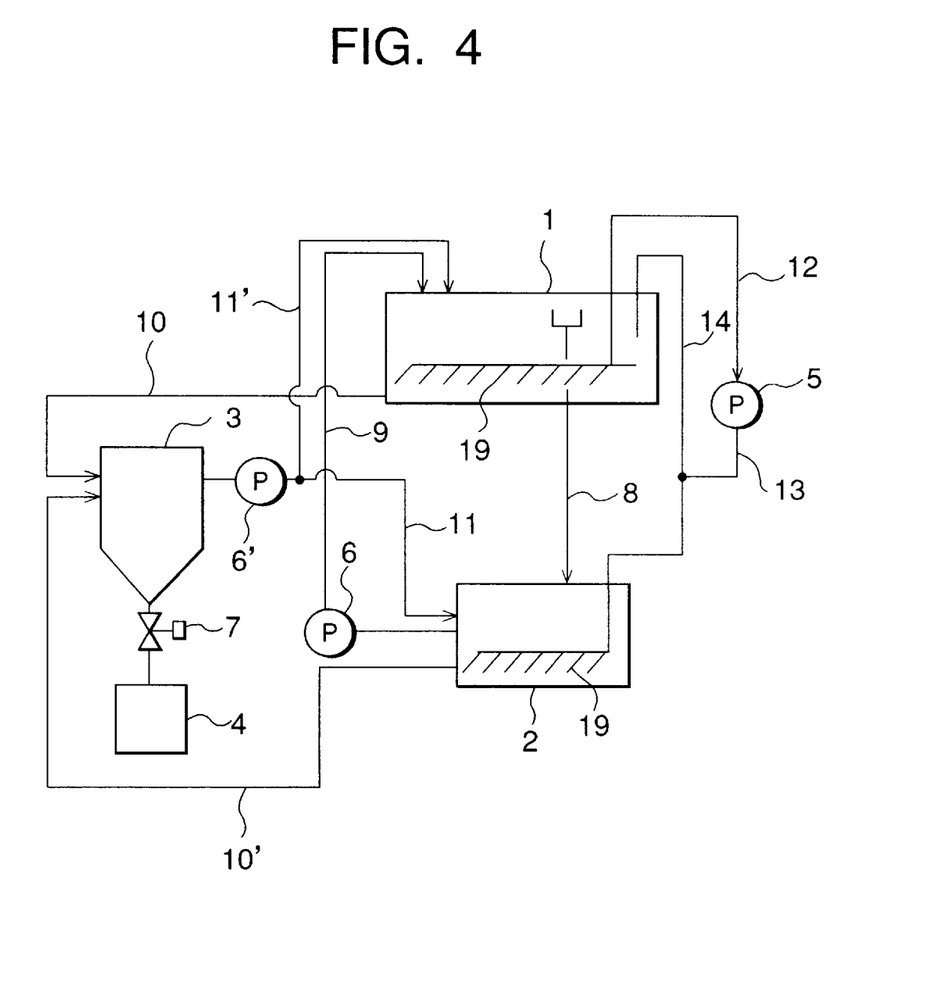
FIG. 4 is a flowchart schematically showing another embodiment of the present invention.
Figure 5:
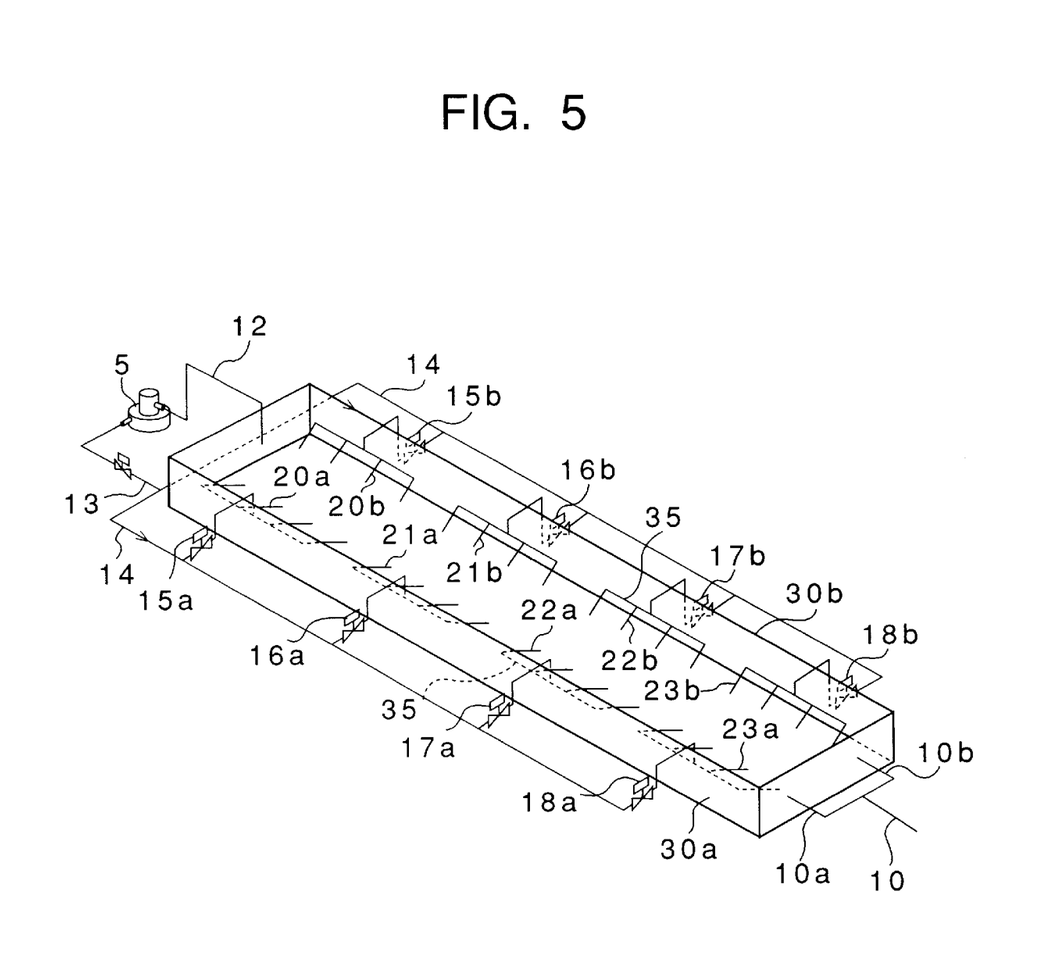
FIG. 5 is a diagram schematically showing a pickling tank and ejectors installed therein.
Figure 6:
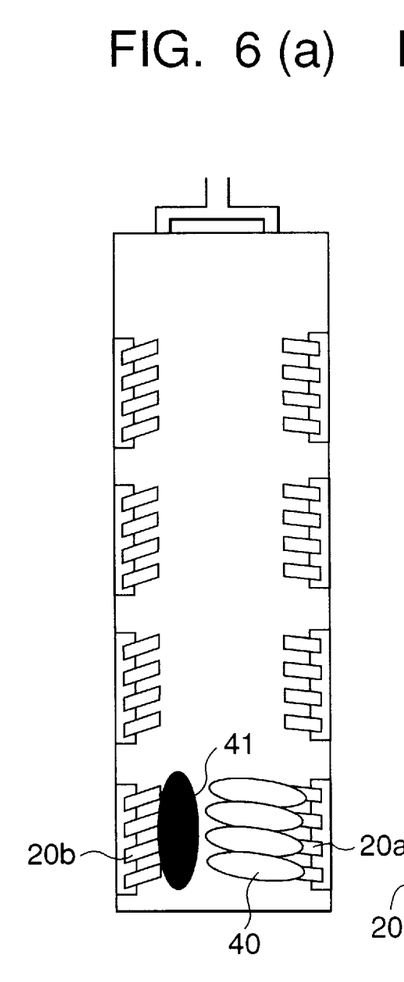
FIG. 6 is a diagram schematically showing sedimentary sludge which is being moved by the liquid ejected from the ejectors.
Figure 7:
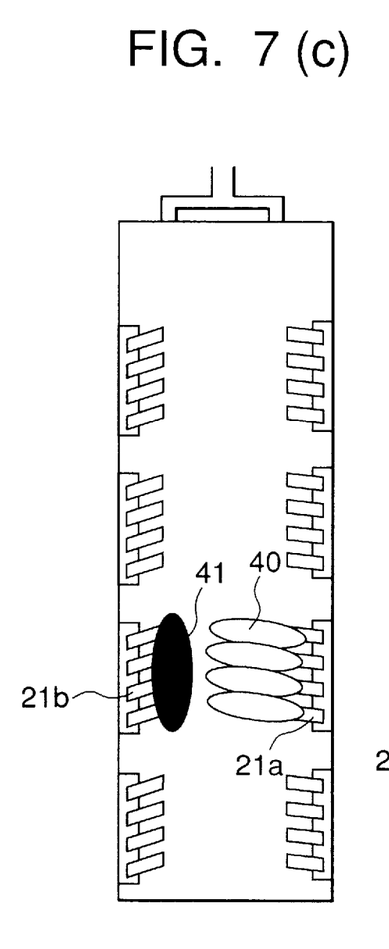
FIG. 7 is a diagram schematically showing sedimentary sludge which is being moved by the liquid ejected from the ejectors.
Figure 8:
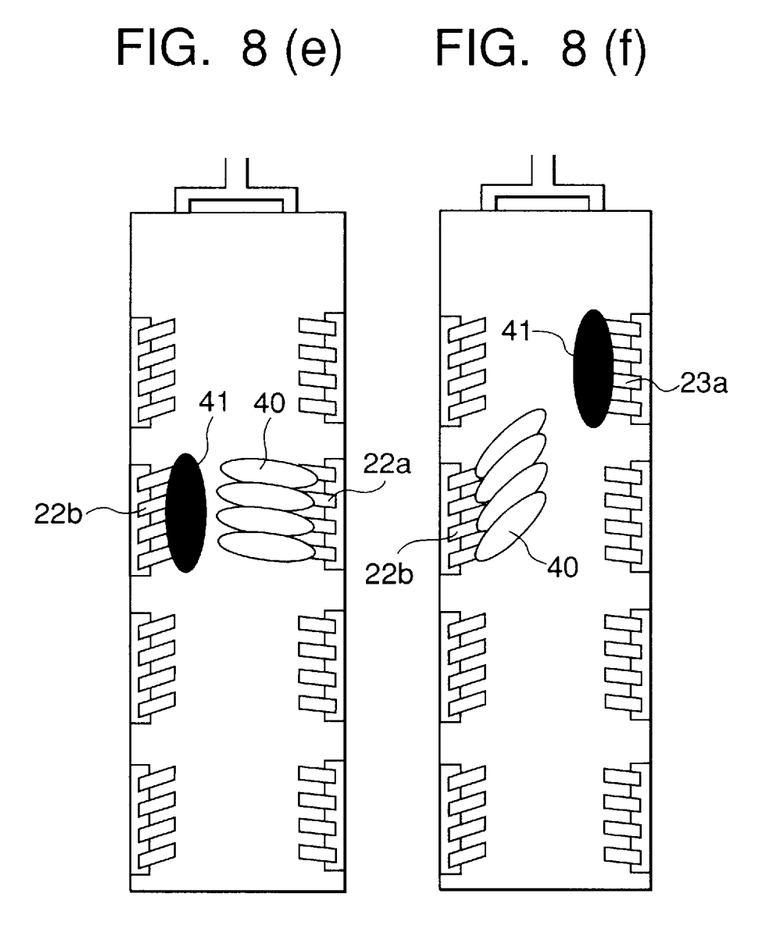
FIG. 8 is a diagram schematically showing sedimentary sludge which is being moved by the liquid ejected from the ejectors.
Figure 9:
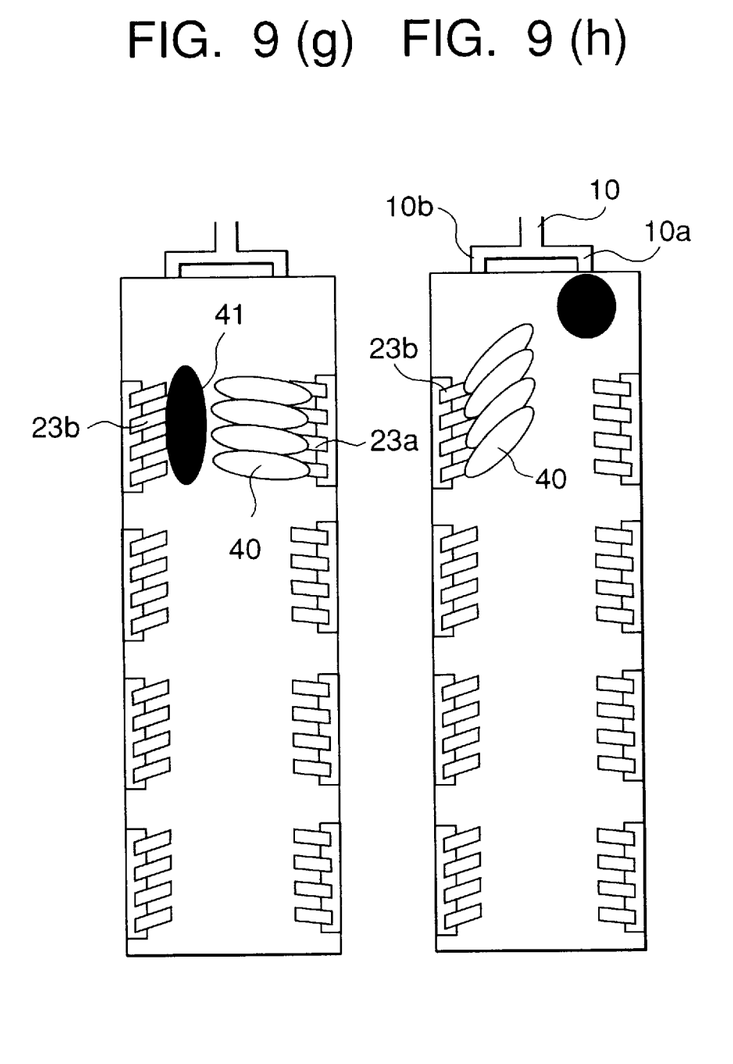
FIG. 9 is a diagram schematically showing sedimentary sludge which is being moved by the liquid ejected from the ejectors.
Figure 10:
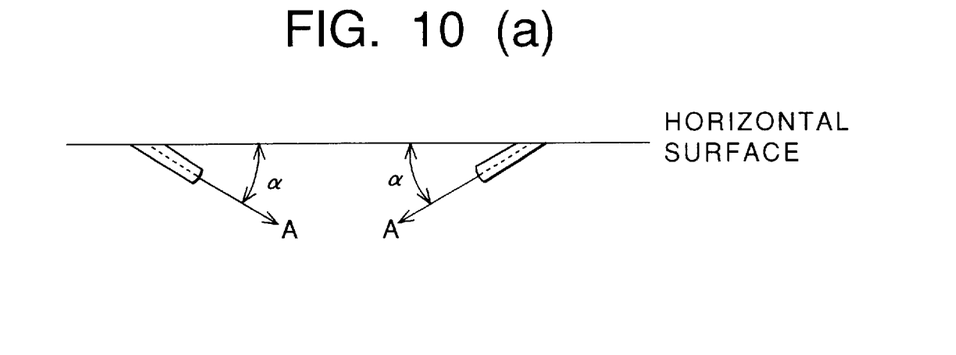
FIG. 10 is a diagram showing the ejecting direction of the liquid from the ejectors.

Referring to FIG. 4, FIG. 5, and FIG. 10, the flow of process for discharging sludge, i.e. solid particles, from a pickling tank employed in a pickling process for stainless steel plates in accordance with the method and apparatus of the present invention will be described.

FIG. 4 is a schematic diagram showing another embodiment of the pickling process of stainless steel plates which is different from the one shown in FIG. 1. Stainless steel plates (not shown) are pickled in the pickling tank 1. The pickling solution which has overflown from the pickling tank 1 is supplied to the circulating tank 2 via the passage 8. The pickling solution in the circulating tank 2 is returned to the pickling tank 1 via the passage 9 by the pump 6.

The circulating tank 2 is used for adjusting the acid concentration of the pickling solution and for storing the pickling solution in the pickling tank.

The pickling solution in the pickling tank 1 is led to an ejector 19 of the pickling tank 1 or the circulating tank 2 via the passage 12 and the passage 13 by the pump 5. Further, the pickling solution in the pickling tank 1 and the circulating tank 2 contains sludge in high concentration because of the solid-liquid separation and it is sent to the sedimentation tank 3 via the passage 10 and the passage 10'. Clean pickling solution which has been separated in the sedimentation tank 3 and which contains substantially no sludge is returned to the circulating tank 2 via a pump 6' and the passage 11 for recycling. Apparently, when no circulating tank 2 is used, the clean pickling solution is directly returned to the pickling tank 1 via the passage 11'.

The sludge which has been separated and sedimented in the sedimentation tank 3 is stored in the reservoir 4 by opening the valve 7 at an appropriate timing in accordance with the sedimentary amount and it is discharged out of the pickling system. The amount of the sludge to be discharged out of the system is set to a value which is equal to or greater than the amount of the sludge which is generated in the pickling tank 1 so as to prevent the amount of accumulated sludge in the pickling system from increasing.

FIG. 5 is a schematic diagram illustrative of the pickling tank 1, ejectors 20a through 23a and 20b through 23b installed in parallel on the side walls 30a and 30b of the pickling tank, valves 15a through 18a and 15b through 18b, a line from a passage 12 to the foregoing ejectors, and passages (discharging passages) 10a, 10b, and 10 for discharging sludge from the pickling tank 1.

A plurality of (four) ejectors are communicated with the distribution pipes 35; a plurality of (four each) distribution pipes 35 are installed along the side walls 30a and 30b, respectively, of the pickling tank 1.

A proper number of the ejectors, a proper number of the distribution pipes, proper disposition of the distribution pipes, etc. can be decided according to the size and shape of the pickling tank 1.

An ejecting direction A of the pickling solution from the ejectors is preferably 1 to 45 degrees downward with respect to a horizontal surface and more preferably 5 to 30 degrees downward, and they are to be inward with respect to a vertical surfaces (in the sludge discharging passage direction) formed by the side walls of the pickling tank, preferably 0 to 85 degrees, more preferably 30 to 75 degrees (these angles are respectively indicated as "α" and "β" in FIG. 10(a) and FIG. 10(b)).

It should be noted that the liquid ejecting directions of the foregoing ejectors 20a through 23b do not have to be the same for effectively moving sedimentary sludge; they may be designed to be different.

The ejecting speed and ejecting amount of the pickling solution ejected from the ejectors are determined by such factors as the amount of the sedimentary sludge and the location to which the sedimentary sludge is moved.

By employing the pickling tank, the sedimentary sludge which has sedimented on the bottom of the pickling tank is transferred toward the discharging port and discharged into the discharging passage from the pickling tank.

A series of operations for discharging sedimentary sludge from the pickling tank will now be described in conjunction with FIG. 6 through FIG. 9. Regarding the ejecting directions of the liquid from the ejectors 20a through 23a, "α" in FIG. 10 denotes 10 degrees and "β" denotes 75 degrees; in the case of the ejectors 20b through 23b, "α" denotes 10 degrees and "β" denotes 45 degrees.

The pickling solution of the pickling tank is ejected from the four ejectors 20a by opening the valve 15a. The sedimentary sludge in the effective range of the four ejectors 20a is stirred up by the ejected pickling solution, then it sediments in the effective range of the ejectors 20b. When the sedimentary sludge which was in the effective range of the ejectors 20a has nearly settled down, the valve 15a is closed to stop the ejection of the pickling solution.

The effective range of the ejectors mentioned above means a range wherein sedimentary particles can be stirred up by ejecting the solution from the ejectors so that they are moved from a place where they were sedimented. Hence, the effective range of the ejectors changes depending on the direction of the solution ejected, the ejection speed of the solution, the amount of ejection, and the properties (size, specific gravity, etc.) of the sedimentary particles. FIG. 6(a) shows respective effective ranges 40 of the four ejectors 20a. After the solution is ejected from the ejectors, the particles sediment out of the effective ranges.

The pickling solution ejected from the ejectors 20a causes the sedimentary sludge, which has been lying in the effective ranges of the ejectors 20a, to move into the effective ranges of the ejectors 20b and sediment therein. The sedimented sludge is shown as sedimentary sludge 41 in FIG. 6(a).

Then, the valve 15b is opened to eject the pickling solution from the ejectors 20b so as to move the sludge 41, which has moved and sedimented, and the sedimentary sludge, which has already been in the effective range of the ejectors 20b, into the effective range of the ejectors 21a. The ejection of the pickling solution from the ejectors 20b may be started after the ejection of the pickling solution from the ejectors 20a is stopped and the stirred sludge has completely settled down, or it may be started when a majority of the sludge, preferably 20% or more thereof, has sedimented. Accordingly, the ejection from the ejectors 20b may alternatively be begun as soon as or slightly before the ejection from the ejectors 20a is stopped.

The pickling solution ejected from the ejectors 20b moves the sedimentary sludge 41 into the effective range of the ejectors 21a (see FIG. 6(b)).

By repeating the operation described above, the sedimentary sludge is moved toward the discharging passage 10 as shown in FIG. 7(c) and (d), FIG. 8(e) and (f), and FIG. 9(g). The sedimentary sludge 41 shown in FIG. 9(g) is moved into the discharging passage 10a by the pickling solution ejected from the ejectors 23b and discharged out of the pickling tank as illustrated in FIG. 9(h).

The sedimentary sludge is discharged from the tank by the operation discussed above; however, since the pickling process is continuously implemented, the sludge is repeatedly sedimented in the tank. Therefore, the foregoing operation is repeated at proper timings to discharge the sedimentary sludge out of the tank.

According to the method described above, it is not necessary to eject the pickling solution from all ejectors at all times; instead, the solution is ejected from a few ejectors in sequence when discharging the sedimentary sludge from the tank. This requires a smaller capacity of the pump 5 with consequent reduced consumption of electric power. Thus, the method in accordance with the present invention is economical.

The flow of the process for discharging the sludge from the pickling tank has been described. When there is a circulating tank, the sludge can be discharged from the circulating tank by using the similar method and equipment.

Furthermore, a basically the same concept as that described above can be used as the method and equipment for discharging sedimentary solid particles from various types of tanks including a plating tank and a cleaning tank for metal plates.

Moreover, according to the present invention, solid particles are separated by a solid-liquid separator from a solution in which the solid particles such as sludge discharged from the foregoing various types of tanks are present. The solution is cooled before or after it is introduced into the solid-liquid separator in order to improve the separating efficiency of the solid particles.

The temperature to which the solution is cooled down depends on the type of the metal material to be pickled or plated, the type of pickling solution or plating solution, the temperature of the pickling solution or plating solution, etc.; however, the solution in which the solid particles discharged from the various tanks are present is almost a saturated solution and therefore, the sedimentation of the solid particles can be promoted by cooling it to a temperature below the temperature of the pickling tank or plating tank. As the solution is cooled more, the separating efficiency of the solid particles increases. On the other hand, however, excessive cooling would require reheating the solution when recycling the solution; therefore, a proper temperature to which the solution is cooled should be set.

For example, when stainless steel plates are pickled at 80 degrees centigrade with sodium sulfate pickling solution or sulfuric acid pickling solution, the solution should be cooled to a temperature of 40 degrees centigrade or lower. When pickling at 60 degrees centigrade with nitric hydrofluoric acid pickling solution, the solution should also be cooled to a temperature of 40 degrees centigrade or lower. The lower limit of the cooling temperature should be approximately 25 degrees centigrade from a viewpoint of energy cost.

Figure 11:
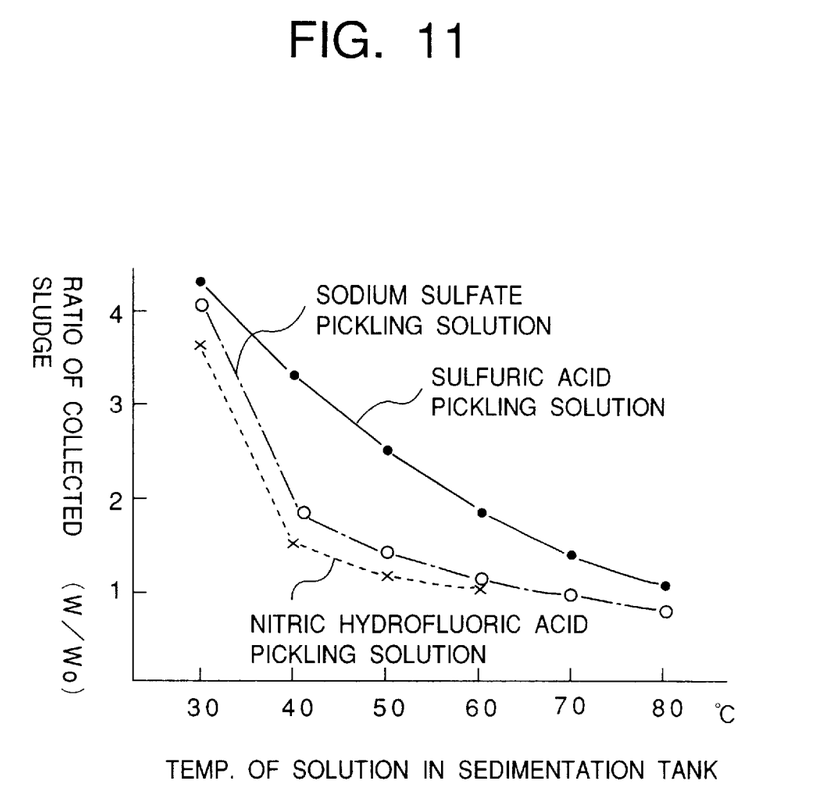
FIG. 11 is a graph showing the efficiency of separating the sludge in relation to the temperatures of the pickling solutions in sedimentation tanks.

FIG. 11 shows a graph which specifically indicates the improvement in the sludge separating efficiency achieved by cooling.

In the specific example, the sodium sulfate pickling solution (temperature of the pickling tank: 80 degrees centigrade), the sulfuric acid pickling solution (temperature of the pickling tank: 80 degrees centigrade), and the nitric hydrofluoric acid pickling solution (temperature of the pickling tank: 60 degrees centigrade) are used as the pickling solutions for stainless steel plates, and a sedimentation tank is employed as the solid-liquid separator. These pickling solutions which contain sludge are introduced in the sedimentation tank and cooled to the temperatures shown on the axis of abscissa of the graph given in FIG. 11; the graph shows curves obtained by plotting the values of the ratio of collected sludge (W/Wo) which is determined by dividing an amount W of sludge, which is sedimented and collected when the solutions containing the sludge are cooled to the temperatures indicated on the axis of abscissa of the graph, by an amount Wo of the sludge, which is sedimented and collected when the solutions containing the sludge are not cooled.

A greater ratio of collected sludge means higher separating efficiency of the sludge.

It is obvious from the graph shown in FIG. 11 that cooling the pickling solutions leads to improved separating efficiency of the sludge.

The separating efficiency of the sludge is improved by cooling the pickling solutions because it is presumed that, as previously described, the pickling solutions are almost saturated, so that the metallic ions, e.g. ferrous ions, dissolved in the pickling solutions are easily combined with acid radicals to form $FeSO_4$, for example, and precipitated and they are prone to combine with the sludge, which is already present as solid particles, to form larger particles which sediment more easily.

The pickling solution, from which the sludge has been separated in the solid-liquid separator, is circulated to the pickling process. Since the pickling solution has been cooled, circulating the solution as it is would cause a drop in the treatment temperature in the pickling process. Hence, it is preferable to heat the solution to the treatment temperature in the pickling process before it is circulated back to the pickling process.

A flow will now be described in which the method in accordance with the present invention is specifically applied to the pickling process of stainless steel plates.

Figure 12:
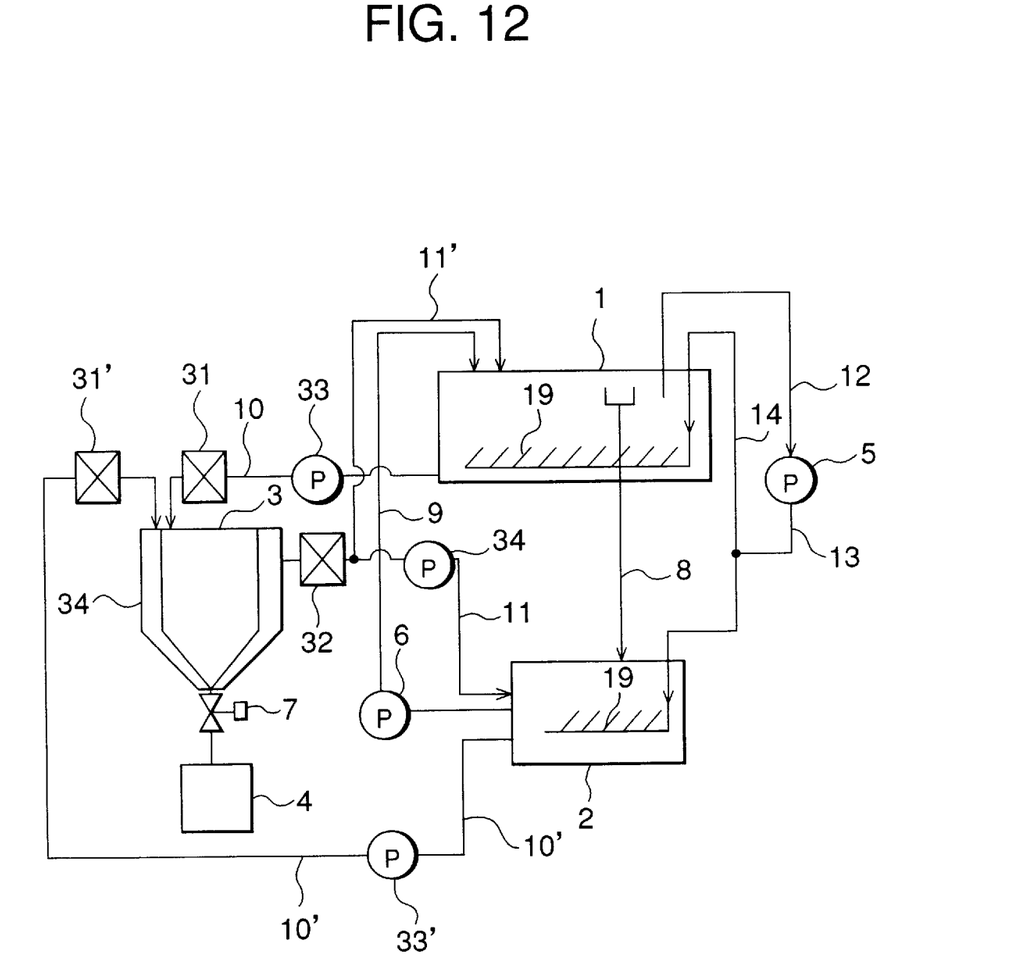
FIG. 12 is a flowchart schematically showing a further embodiment of the present invention.

FIG. 12 shows a schematic flow in which the pickling solution is ejected from the ejector 19 installed on the bottom of the pickling tank 1, in which a metal material such as a stainless steel plate (not shown) is pickled, and from the ejector 19 set on the bottom of the circulating tank 2, if any, to move the sludge on the bottoms of the tanks to the discharging port to discharge it, a part of the pickling solution which contains suspended sludge is sent to the solid-liquid separator 3 to separate it into liquid and sludge, the separated liquid which contains substantially no sludge is circulated as a pickling solution, and the separated sludge is discharged out of the pickling system.

The pickling solution overflown from the pickling tank 1 is supplied to the circulating tank 2 via the passage 8. The pickling solution in the circulating tank 2 is returned to the pickling tank 1 via the passage 9 by the pump 6. The circulating tank 2 is used for adjusting the concentration or volume by supplying additional solution by a device not shown or for storing the pickling solution when draining the pickling tank.

The pickling solution in the pickling tank 1 is led to the ejector 19 of the pickling tank 1 or the circulating tank 2 via the passage 12 and the passage 13 by the pump 5. Further, the pickling solution in the pickling tank 1 is sent to the sedimentation tank 3 by the pump 33 via the passage 10 for the solid-liquid separation. Clean pickling solution which has been separated in the sedimentation tank 3 and which contains substantially no sludge is returned to the circulating tank 2 via a pump 34 and the passage 11 for recycling. It is obvious that, if the circulating tank 2 is not used, then the clean pickling solution is directly returned to the pickling tank 1 via the passage 11'. It is possible to provide heat exchangers (coolers) 31 and 31' in the middles of the passages 10 and 10' for leading the pickling solution to the sedimentation tank 3 for sedimenting and separating sludge in order to cool the pickling solution. In this case, it is preferable to provide the sedimentation tank 3 with an adiabatic device 34 to prevent the temperature of the pickling solution from rising in the sedimentation tank.

As another method for cooling the pickling solution, instead of installing the heat exchanger (cooler) 31, the cooling device 34 is installed in the sedimentation tank 3 and the pickling solution is cooled by the cooling device 34 after the pickling solution is introduced in the sedimentation tank 3.

It is desirable to install a heating device 32 in the passage 11 to heat the clean pickling solution from which the sludge has been separated in the sedimentation tank 3.

The sludge which has been separated and sedimented in the sedimentation tank 3 is stored in the reservoir 4 by opening the valve 7 at an appropriate timing in accordance with the sedimentary amount and it is discharged out of the pickling system. The amount of the sludge to be discharged out of the system is set to a value which is equal to or greater than the amount of the sludge which is generated in the pickling tank 1 so as to prevent the amount of cumulated sludge in the pickling system from increasing.

Thus, the processing method in accordance with the present invention can be applied to the pickling solution which contains sludge in a relatively high concentration; in the processing method, after the sludge sediments in the pickling tank or the circulating tank to a certain extent, the pickling solution is ejected from the ejectors to move the sedimented sludge to the discharging passages of the respective tanks. The processing method in accordance with the present invention can be applied also to a pickling solution, the sludge of which is suspended rather than being sedimented in the pickling tank and the circulating tank by ejecting the pickling solution from the ejectors.

The method described above makes it possible to efficiently separate the sludge, which is generated by pickling a metal material, especially a stainless steel plate, in a pickling tank, from the pickling solution.

Industrial Applicability

According to the present invention, the following advantages can be expected:

1) In a method of and an apparatus for discharging sedimentary solid particles, which exist on the bottom of a tank holding a solution wherein solid particles are present, out of the tank, a liquid is ejected by ejectors to move the sedimentary solid particles; therefore, no mechanical driving section or wearing parts are involved, thus permitting the freedom from maintenance (Embodiments 1 to 24).

2) It is not necessary to eject the liquid from all ejectors at all times; instead, the liquid is ejected from the ejectors only when discharging the sedimentary solid particles from the tank. This leads to reduced consumption of electric power, ensuring economy (Embodiments 1 to 24).

3) It is not necessary to eject the liquid from all ejectors at all times; instead, the liquid is ejected from a few ejectors in sequence when discharging the sedimentary solid particles from the tank. This requires a smaller capacity of a pump and accordingly reduced consumption of electric power, thus ensuring economy (Embodiments 5 to 10 and 20).

4) The solid particles generated in a pickling tank and circulating tank for stainless steel plates, a plating tank, etc. can be discharged from the tanks in an economical and efficient manner (Embodiments 1 to 24).

What is claimed is:

1. A method for preventing particles from accumulating in a tank, used for pickling or plating metallic materials, which comprises at least one ejector and which can hold sedimentary solid particles on a bottom of the tank and a first solution, the method comprising:

ejecting a liquid from the at least one ejector into the sedimentary solid particle on the bottom of the tank, so as to move the sedimentary solid particles to a predetermined place from which the sedimentary solid particles can be discharged out of the tank;

discharging from the tank a second solution containing at least one of the sedimentary solid particles;

cooling the second solution to a temperature below a temperature of the first solution and below 40 degrees centigrade to precipitate solid particles from of the second solution; and separating at least one solid particle from the second solution.

2. A method according to claim 1, wherein the sedimentary solid particles are moved into a pocket installed in the tank and the sedimentary solid particles collected in the pocket are discharged out of the tank.

3. A method according to claim 2, wherein the liquid is ejected from the at least one ejector provided at one end in the tank to move the sedimentary solid particles into a pocket provided at another end facing against the ejector to discharge the sedimentary solid particles out of the tank.

4. A method according to claim 3, wherein the liquid is ejected from the ejector downward 1 to 45 degrees with respect to a horizontal surface and inward the tank and toward the pocket with respect to a vertical surface which includes a long side of a horizontal section of the tank.

5. A method according to claim 1, wherein the liquid is ejected in sequence from a plurality of ejectors installed in the tank, beginning with the ejector which is disposed far from the discharging place so as to gradually move the sedimentary solid particles to the discharging place.

6. A method according to claim 1, wherein the tank is a pickling tank for a stainless steel plate, the first solution is a pickling solution, the liquid ejected from the ejectors is the pickling solution, and the sedimentary solid particles are sludge.

7. A method according to claim 1, wherein the step of separating comprises using a solid-liquid separator.

8. A method according to claim 7, wherein the solid-liquid separator is a sedimentation tank.

9. A method according to claim 7, wherein the second solution is cooled in advance before introducing it into the solid-liquid separator.

10. A method according to claim 7, wherein the second solution is cooled after introducing it into the solid-liquid separator.

11. A method according to claim 7, wherein the second solution is a pickling solution for a stainless steel plate, the pickling solution is a sodium sulfate pickling solution, a sulfuric acid pickling solution, or a nitric hydrofluoric acid pickling solution, and the pickling solution is cooled down to 40 degrees centigrade or lower.

12. A method according to claim 7, wherein the second solution is a pickling solution, and a clean pickling solution, from which the at least one solid particle has been separated, is heated before it is circulated to a pickling process.

13. A method for preventing particles from accumulating in a tank, which comprises at least one ejector and which can hold sedimentary solid particles on a bottom of the tank and a first solution, the method comprising:

ejecting a liquid from the at least one ejector into the sedimentary solid particles on the bottom of the tank, so as to move the sedimentary solid particles to a discharging place;

wherein the liquid is ejected in sequence from a plurality of ejectors installed in the tank, beginning with the ejector which is disposed far from the discharging place;

the tank has an approximately rectangular horizontal section; and said method further comprises steps of:

disposing the plurality of ejectors on both side walls of the tank along a long direction of the tank so that the plurality of ejectors are nearly parallel;

ejecting a liquid in an operation (I) from at least one of the plurality of ejectors (A) on one side of the tank toward sedimentary solid particles which exist in an effective ejection range of the ejectors (A) so as to move at least a part of said particles to within an effective ejection range of at least one of the plurality of ejectors (B) on another side of the tank; and ejecting a liquid in an operation (II), immediately after or a predetermined time after the ejection of the liquid in the step (I) has substantially been completed, from at least one of the ejectors (B) on the other side of the tank toward the sedimentary solid particles which have been moved into the effective ejection range of the ejectors (B) by the operation (I) so as to move at least a part of said particles, thereby moving the sedimentary solid particles toward the discharging place provided in the tank.

14. A method according to claim 13, wherein the operation (II) is implemented so that the sedimentary solid particles are moved into an effective range of at least one of the plurality of ejectors (A') which is closer to the discharging place than the ejectors (A) in the operation (I).

15. A method according to claim 14, wherein:

(1) the operations (I) and (II) are implemented a plurality of times;

(2) in both operations (I) and (II), the ejectors for ejecting the liquid in the later operation are closer to the discharging place than the ejectors used in the earlier operation, and (3) when the operation (I) is carried out after the operation (II), the operation (I) is started immediately after or a predetermined time after the ejection of the liquid in the operation (II) is substantially completed.

16. A method according to claim 13, wherein the liquid ejected from the ejectors is directed downward 1 to 45 degrees with respect to a horizontal surface and it is also directed toward the inside of the tank by 0 to 85 degrees with respect to a vertical surface which contains a long side of a horizontal section of the tank.

17. A method according to claim 16, wherein the liquid ejected from the ejectors is directed downward 5 to 30 degrees with respect to a horizontal surface, and the liquid is also directed toward the inside of the tank by 30 to 75 degrees with respect to a vertical surface which contains a long side of a horizontal section of the tank.

18. An apparatus for discharging sedimentary solid particles existing on a bottom of a tank, used in processes for pickling or plating metallic materials, which holds a first solution wherein solid particles are present, said apparatus comprising:

at least one ejector which is installed in the tank and which ejects a liquid to the sedimentary solid particles on the bottom of the tank to move the solid particles to a discharging place;

a device for discharging the sedimentary solid particles, which have been collected in the discharging place, out from the tank;

a controller for ejecting the liquid through the ejector at a desired time;

a solid-liquid separator for separating solid particles from a second solution which has been discharged from the tank; and a heat exchanger for cooling the second solution below 40 degrees centigrade to precipitate solid particles from said second liquid.

19. An apparatus according to claim 18, wherein the discharging place has a pocket structure.

20. An apparatus according to claim 18, wherein the ejector is installed on one end of a side wall of the tank, and a pocket for collecting the sedimentary solid particles is installed along another side wall on another end of the tank facing against the ejector.

21. An apparatus according to claim 18, wherein the tank further comprises a plurality of ejectors that are installed on both sides walls along a long direction of the tank, and the effective ejection ranges of the ejectors on one side wall partly overlap with the effective ejection range of at least one ejector on the other side wall.

22. An apparatus according to claim 18, wherein the solid-liquid separator has a cooling device for cooling the second solution to a temperature of 40 degrees centigrade or lower.

23. An apparatus according to claim 18, wherein the tank is a pickling tank for a stainless steel plate, the first solution is a pickling solution, the liquid ejected from the ejectors is the pickling solution, and the solid particles are sludge.

* * * * *